Figure 1:
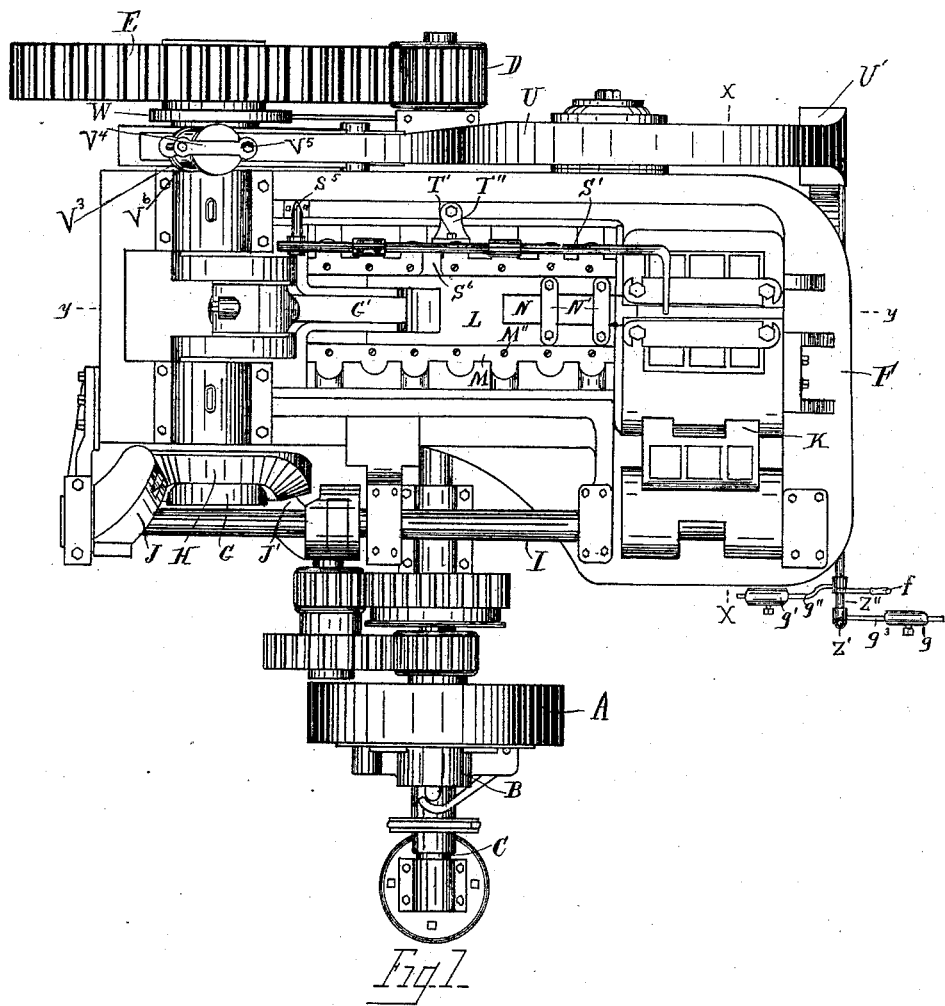

(No Model.) 5 Sheets—Sheet 1.

W. L. CLOUSE.
HEADING, FORGING, AND UPSETTING MACHINE.

No. 430,834. Patented June 24, 1890.

WITNESSES
Anna J. Lehaney
E. J. Robinson

INVENTOR
William L. Clouse
By William Webster
Atty (No Model.) 5 Sheets—Sheet 2.
W. L. CLOUSE.
HEADING, FORGING, AND UPSETTING MACHINE.

No. 430,834. Patented June 24, 1890.

(No Model.) 5 Sheets—Sheet 3.
W. L. CLOUSE.
HEADING, FORGING, AND UPSETTING MACHINE.
No. 430,834. Patented June 24, 1890.

WITNESSES
Anna J. Lehaney
E. J. Robinson.

INVENTOR
William L. Clouse
By William Webster
Atty (No Model.) 5 Sheets—Sheet 4.
W. L. CLOUSE.
HEADING, FORGING, AND UPSETTING MACHINE.
No. 430,834. Patented June 24, 1890.
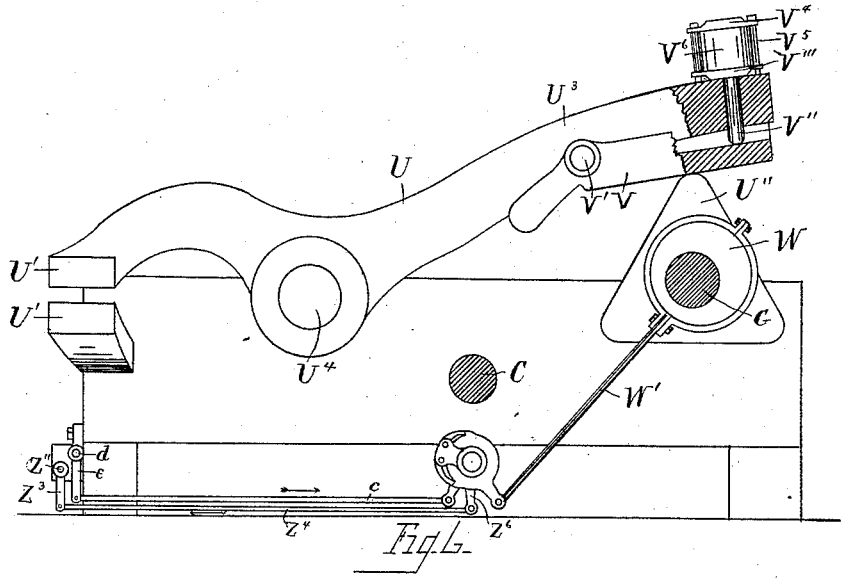
Fig. 6.
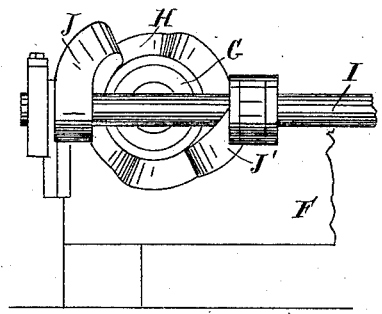
Fig. 7.
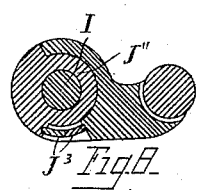
Fig. 8.
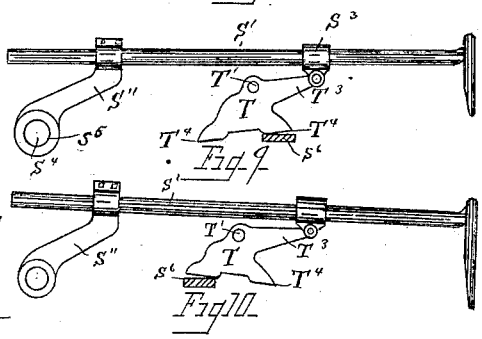
Fig. 9.
Fig. 10.
WITNESSES
Anna J. Lehaney.
E. J. Robinson
INVENTOR
William L. Clouse
By Wm Webster
Atty (No Model.) 5 Sheets—Sheet 5.
W. L. CLOUSE.
HEADING, FORGING, AND UPSETTING MACHINE.
No. 430,834. Patented June 24, 1890.
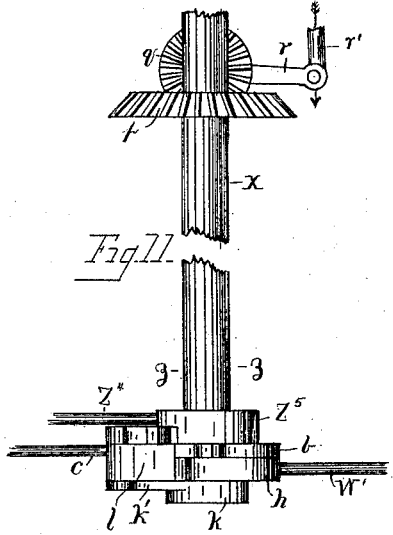
Fig.11.
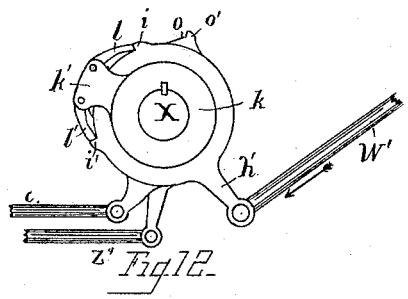
Fig.12.
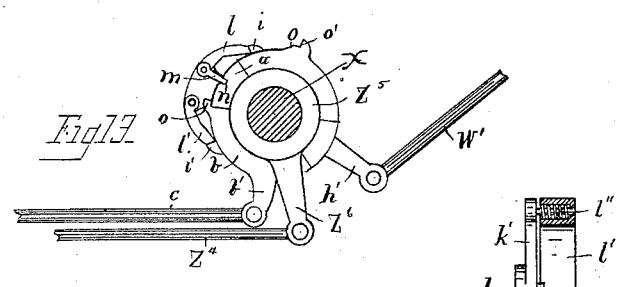
Fig.13.
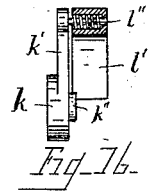
Fig.16.
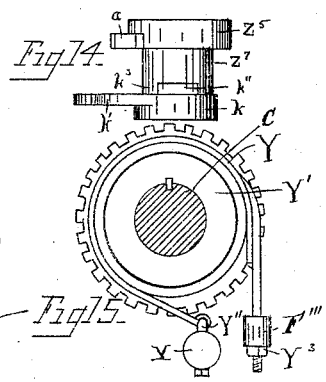
Fig.14.
Fig.15.
WITNESSES
Anna J. Lehaney
E. J. Robinson
INVENTOR
William L. Clouse
By William Webster
Atty

UNITED STATES PATENT OFFICE.

WILLIAM L. CLOUSE, OF TIFFIN, OHIO, ASSIGNOR TO WILLIAM R. ANDERSON, OF SAME PLACE.

HEADING, FORGING, AND UPSETTING MACHINE.

SPECIFICATION forming part of Letters Patent No. 430,834, dated June 24, 1890.

Application filed July 23, 1889. Serial No. 318,393. (No model.)

*To all whom it may concern:*

Be it known that I, WILLIAM L. CLOUSE, a citizen of the United States, and a resident of Tiffin, in the county of Seneca and State of Ohio, have invented certain new and useful Improvements in a Heading, Forging, and Upsetting Machine; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a heading, forging, and upsetting machine, and is designed for use in heading bolts, rods, rivets, ear-pins, &c., being equally well adapted for upsetting the ends of truss-rods, stud ends for connecting-rods, round and rectangular eye-bars, and also for forging stock in shape for the drop-hammer or forge or for welding links and turn-buckles.

The object of the invention is to construct a mechanism with sufficient strength and power to accomplish heavy work and yet be easily controlled by the operator.

A further object is to provide for interchangeability of either the gripping or head dies.

A further object is to operate the gripping-jaws by means of a rocking bar deriving motion directly from the main shaft.

A further object is to provide a system of clutch and brake levers, whereby the movement of the power mechanism is entirely under the control of the operator in the manipulation of two levers.

A further object is to provide a gage for the stock that shall regulate the admission of the same into the gripping-jaws and automatically rise upon the approach of the plunger.

A further object is to construct a bed-plate for the machine of a single casting so formed as to bear all the strain of the power mechanism.

The invention consists in the parts and combination of parts hereinafter described, and pointed out in the claims.

Figure 2:
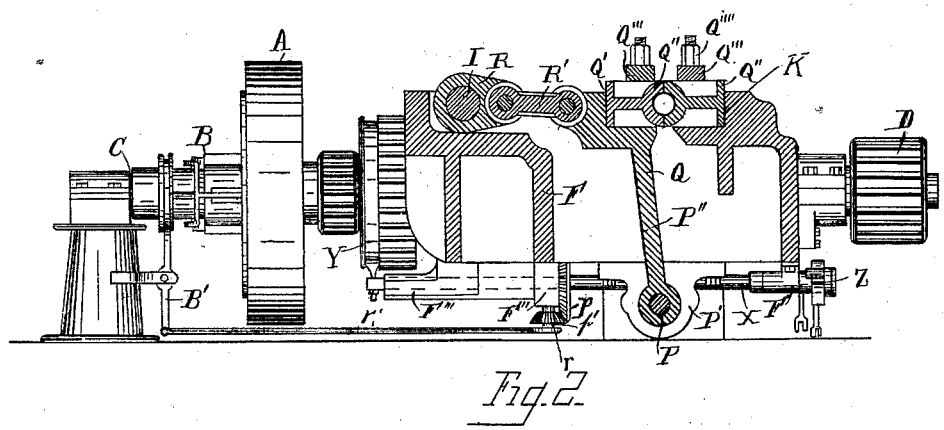
Figure 3:
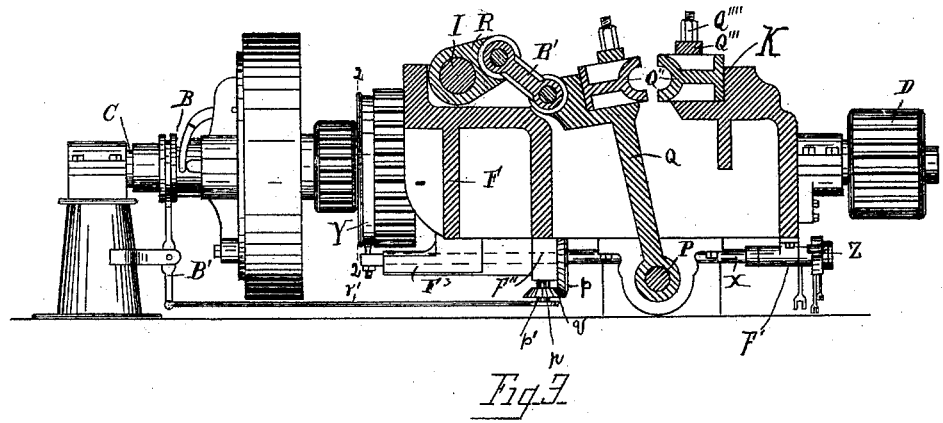
Figure 4:
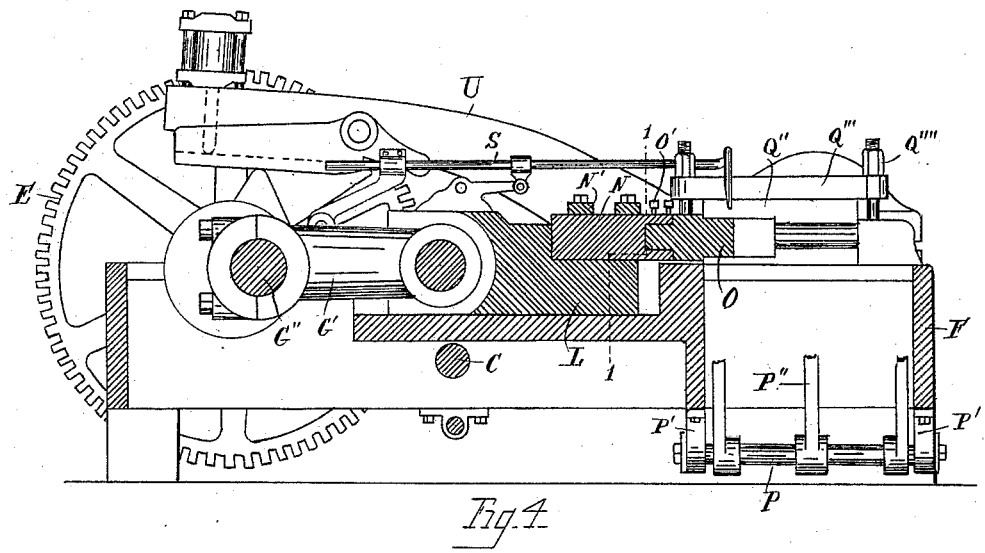
Figure 5:
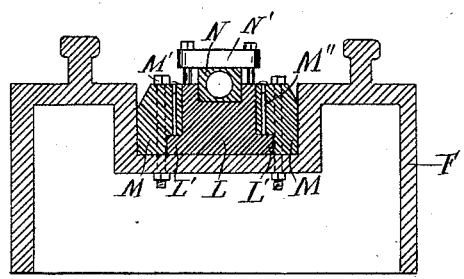

In the drawings, Figure 1 is a plan view of a complete device. Fig. 2 is a transverse section on lines *x x*, Fig. 1, showing the form of and mechanism for operating the clamping-jaws. Fig. 3 is a like view showing the clamping-jaws open to receive the stock. Fig. 4 is a longitudinal vertical section on lines *y y*, Fig. 1, showing the plunger and heading-die, also the crank by which it is reciprocated. Fig. 5 is a transverse section on lines 1 1, Fig. 4, showing the ways upon the bed-plate in which the plunger reciprocates. Fig. 6 is a side view showing a vertically-reciprocating lever for use in bending, shearing, or trimming stock, and the triangular plate for operating the same, also the eccentric and rod connection with the stop and starting motion controlling the heading mechanism, the side gear and pinion being removed to disclose these parts. Fig. 7 is a detail view of the side cams and rocking bar with the rocker-arms bearing upon the cams. Fig. 8 is a sectional view of one of the rocker-arms, showing the breaker by which means injury to the parts is prevented should there be an excess of stock placed between the clamping-jaws. Fig. 9 is a side view of the gage for regulating the feed of stock to be headed, the gage being shown as raised. Fig. 10 is a like view with the gage shown as lowered to check the feed of stock. Fig. 11 is a plan view of the stop and starting motion, showing the intermeshing bevel-pinions to operate the clutch, and also the shaft for operating the brake. Fig. 12 is an end view of the stop and starting mechanism. Fig. 13 is a sectional view on line *z z*, Fig. 11. Fig. 14 is a plan view of the stop and starting mechanism with certain parts removed to disclose the interior clutch upon the shaft operating the main clutch and brake. Fig. 15 is a transverse view on lines 2 2, Fig. 3, showing the brake-strap and its connections. Fig. 16 is a transverse view of one of the pawls, showing the torsion-spring by which it is held in engagement with the catch.

A designates the main driving pulley, from which power is applied through the medium of clutch B, mounted on shaft C, said shaft extending transversely of the bed-frame and having pinion D keyed thereon, which intermeshes with a gear E upon a crank-shaft G.

F designates the frame, formed of a single piece and having bearing-points for the shafts and reciprocating mechanism integral therewith.

On the end of the shaft G opposite to the gear E is a duplex cam-disk H, which operates a rock-shaft I through the medium of two oppositely-disposed rocker-arms J and J', secured to the rock-shaft I, by which means a semi-revolution is given to the rock-shaft, and thereby a reciprocating motion to one of the gripping-jaws of the clamping mechanism, as will be more fully described.

G' is a pitman journaled at one end to the crank G'' of shaft G, and at the opposite end to a plunger L, formed with flanged bearings L' upon the lower side thereof, which reciprocate in a way formed in guide-irons M, held to the bed-plate by bolts M', the plunger being lubricated through perforations M'' in the guide-irons.

N designates a die-holder secured to plunger L by straps N', bolted to the plunger. The holder is formed with a recess into which is secured a die O by means of bolts O'.

I will now describe the way in which the stock is held to receive the impact of the die O.

P designates a shaft journaled in the under side of the frame by hangers P'. To shaft P are secured arms P'' of a clamping-jaw Q, which when closed coincides with a like jaw in frame F.

To rock-shaft I is keyed an arm R, that is given a partially rotative motion coincident with the semi-revolution of the rock-shaft when actuated by cams H. Arm R is pivotally connected with the movable clamping-jaw Q by a link R'.

Jaw Q is cut away at Q' to receive a die Q'', as is also frame F at K, opposite to the movable clamping-jaw Q, to receive a corresponding die Q''', said dies being secured in place by bars Q''', through which are passed bolts Q'''', secured to the frame and movable clamping-jaw respectively. By this means any form of die may be inserted, and, together with the removable plunger-die, any desired form of head may be formed upon a rod or bolt.

S designates the gage formed of a bar S', having the forward end bent to pass over the die-holder Q''', and to pass between the clamping-dies when opened.

S'' and T are rocking levers pivoted to the frame at $S^5$ by pivot $S^4$ and at T' respectively, the gage-rod S' being secured to the rocking levers by being clamped between the bifurcated end of lever S'' and secured in a pivoted holder $S^3$ upon lever T. Rocking lever T is caused to raise and lower the gage by the reciprocation of the plunger by reason of a projection $S^6$ thereon, which alternately strikes the base projections $T^4$ of the lever, thereby causing the end $T^3$ of lever T to rise and fall upon fulcrum or pivot T'.

U designates a vertically-reciprocating lever pivoted at the side of the machine at $U^4$, and provided with a jaw U' for a die, there being a corresponding jaw U'' upon the frame, this lever being intended for use in bending, trimming, or shearing stock, the character of the work being determined by the form of the die inserted in the receptacles or jaws U'. Lever U is caused to rise and fall by means of a three-lobed cam U'', secured upon shaft G.

To cushion the blow of the forward end of the lever, a plate V is pivoted to the rear end of the lever at V', and against which the cam U'' bears, plate V being held from the lever by a piston V''', bearing against the upper side thereof, and against a plate V''' upon the upper side of the lever, upon which is secured a rubber cushion $V^6$ by being clamped between plate V''' and a plate $V^4$ by bolts $V^5$, threaded into the end of the lever.

W designates an eccentric secured on shaft G between gear E and the cam U'', the eccentric being connected with the stop-and-starting-motion mechanism by a rod W'.

X designates a shaft journaled in bearings in brackets F' F'' below the frame F, as shown in Figs. 2 and 3, said shaft extending through bracket F''' to allow of one end of a brake-strap Y being secured thereto, by which means when the shaft is turned strap Y will be tightened upon brake-wheel Y' and stop the machine. The opposite end of the brake-strap being passed through a perforation in an arm F'''' of bracket F''' and held securely by nut $Y^3$. To the opposite end of shaft X, to which the brake mechanism is attached, is a stop-and-starting-motion attachment Z, which I will now describe.

Z' is a hand-lever attached to a shaft Z'' by being keyed thereon, and on the opposite end of said shaft is a lever $Z^3$, bifurcated on its lower end to receive a rod $Z^4$, the opposite end of said rod being connected with a lever $Z^6$ on a plate $Z^5$. Plate $Z^5$ is loosely journaled on shaft X, and is formed with a sleeve $Z^7$, on which the loosely-mounted plates $b$ and $h$ are journaled.

$b$ is a plate loosely mounted on sleeve $Z^7$, said plate being rocked by rod $c$, one end of which is connected with an integral arm $b'$ of the plate $b$, the opposite end being journaled in the bifurcated end of lever $e$.

$d$ is a shaft upon which lever $e$ is keyed, the opposite end having a hand-lever $f$ keyed thereon, by which movement is given to plate $b$.

$g\ g'$ are weights attached, respectively, to shafts Z'' and $d$ on arms $g^3$ and $g''$, respectively, the use of which will be more fully described.

$h$ is a loosely-mounted plate journaled on sleeve $Z^7$, and is connected to eccentric-rod W' by an arm $h'$, integral with the plate.

$k$ is a collar keyed to shaft X, said collar having a projecting portion $k'$, to which are pivotally secured pawls $l$ and $l'$. On the inner side of collar $k$ is a clutch-piece $k''$, that intermeshes with a corresponding clutch-piece $k^3$ on the end of the sleeve $Z^7$. Plate $h$ has catches $i$ and $i'$, on which pawls $l$ and $l'$ respectively engage. Pawl $l$ has a finger $m$ integral therewith, which engages in a recess $n$ in an enlarged portion $a$ of plate $Z^5$, and by which, when plate $Z^5$ is turned, it will raise or lower the pawl, engaging or disengaging it with catch $i$.

$o$ are projections on plate $b$, that when lever $f$ is urged forward allows them to ride under pawls $l$ and $l'$, raising the same to disengage them from catches $i$ and $i'$.

$p$ is a bevel-pinion mounted on shaft X, which meshes with a bevel-pinion $q$, mounted on the underside of bracket F″ by being journaled on a stud $p'$. On the underside of pinion $q$ is keyed an arm $r$ on stud $p'$, said arm being pivotally attached to a rod $r'$, which actuates lever B′ of the clutch.

In operation, when it is desired to set the machine to accomplish any desired form of work, the nuts Q″″ are unloosened, the iron strips are removed, and the dies taken out, and those of the particular form desired are inserted. The gage is then adjusted by unscrewing the screws in the bifurcated end of arms S″, and the rod moved back or forth, as the case may be.

Screws O′ are unscrewed and the die O is removed if it is desired to insert a die of a different character, when a die suited to the particular work to be performed is inserted and screws O′ screwed to place. If the die is too short, the bolts holding bars N′, that secure the die-holder, are loosened and the holder is run forward the desired distance and the bolts screwed to place; or it can be moved back if the die is too long.

To start the machine to make a complete revolution, hand-lever Z′ is pushed forward, causing shaft Z″ to turn. Lever $Z^3$ being rigidly attached to the shaft, will cause rod $Z^4$ to move in the direction of the arrow, Fig. 6, turning the plate $Z^5$. As a result, sleeve $Z^7$ will turn, causing collar $k$ to revolve by the clutch-sections intermeshing, and, as a consequence, revolving the shaft X and turning pinion $p$ and intermeshing pinion $q$, causing lever $r$ to move in the direction of the arrow, also rod $r'$, connected with the clutch. Lever B′, being pulled back, will set the clutch and start the machine. Another consequence arising from the turning of plate $Z^5$ will be the raising of pawl $l$ by finger $m$, the pawl and fingers acting as a bell-crank. When the projection $a$ is turned, the end of the finger resting in the recess $n$ will act on the bell-crank, raising the pawl to disengage it from projection $i$. The first motion of the eccentric-rod is in the direction of the arrow, Fig. 12. The pawl $l'$, being held down by a coiled spring, will engage with the projection $i'$ and complete the setting of the clutch if it is partially set. (It will be understood that the movement of the eccentric is such that it rocks back and forth just far enough to cause shaft X to set or unset the clutch, as desired.) After the machine has started, lever Z′ is loosened by the operator, the weight $g$ causing it to fall back to its original position and allowing pawl $l$ to drop, so that when the eccentric-rod makes its reverse movement the projection $i$ will be in the path of the pawl $l$ and engage with the same, causing the collar $k$ to turn in a reverse direction, unsetting the clutch. When shaft X is turned to set the clutch, it unloosens the brake-strap and allows the machine to run. When the clutch is unset, the same motion causes the brake-strap to tighten on the brake-wheel, stopping the machine. To stop the machine at any other point than at that which the eccentric stops it, lever $f$ is pulled forward by the operator, causing shaft $d$ to turn, also rod $c$ to move in the direction of the arrow by the lever $e$ on shaft $d$, thereby moving the plate $b$ and causing the lugs $o$ to ride under the pawls, raising the same and allowing the eccentric-rod and plate to run free. A further turn of plate $b$ will cause lug $o'$ to strike pawl $l$ and turn collar $k$, turning the shaft X, unloosening the clutch and applying the brake.

When it is desired that the machine shall make a continuous run, the levers Z′ and $f$ are thrown, the lever $f$ being thrown far enough to allow projections $o$ to ride under the pawls, projection $o'$ resting against pawl $l$.

In operation, the stock to be headed or enlarged is placed between the clamping-jaws, the end striking the gages. The machine is started by the operator, throwing lever Z′ forward. If one revolution is desired, or if a continuous run is desired, lever $f$ is thrown in the opposite direction, causing the clutch to tighten and the brake to loosen. Power is applied to crank-shaft G by means of pinions E and D, which derive power from the fly-wheel A through the main shaft C. Crank G″, being connected to plunger L by the crank-rod G′, reciprocates the same to form the head or upset any metal in the path thereof. The rocking bar I is given a semi-revolution by the two-faced side cam by the levers J and J′ acting alternately on the cam-lever J′, causing the jaws to close and lever J opening the same. Lever J′ is formed with a collar J″, over which the arm is partly journaled.

$J^3$ designate pieces of soft metal, which, when the stock is between the jaws, allow the arm to yield should there be too great an amount of metal inserted, the pieces $J^3$, being crushed or forced out of place, allowing the lever to work loosely on the collar, thereby preventing breakage of the machine. The jaws come together in consequence of the toggle movement of lever R and link R′, which allows them to make a straight facing, as the arms P″ are journaled below in the frame.

It will be readily seen that when the plunger moves forward the turning of the crank-shaft turns the cam H and causes arm J′ to ride up, the turn in the cam closing the jaws and holding them closed by the even-raised surface of the cam until the plunger causes the dies to form the head, and as the plunger moves backward the cam turns so that the lever J rides the opposite turn in the cam, opening the jaws, the operation being continued.

The gage is automatic in its action by reason of the projection on the plunger as it moves forward striking the forward projection T⁴ on the lever T, causing the gage to rise, and as the plunger moves backward, the projection coming under the opposite projection on the lever, causes the gage to lower between the jaws in the way of the stock.

The machine is back-geared to vary the speed from the slowest for heavy work to a faster for lighter work. Should it be desired to reduce the stock prior to heading or upsetting the same, it can be accomplished by means of the gripping-dies being forged upon one side between the dies and afterward turned and forged upon the opposite side; or proper dies may be secured in the receptacles U' and lever U employed for this purpose.

In making bolts from a continuous rod the rod may be inserted in the gripping-dies until the end strikes the gage, when the plunger is advanced, forming the head, and the rod removed and placed between shears or cutting-dies secured in receptacles U' and a bolt of the desired length cut from the rod.

What I claim is—

1. In a heading, forging, and upsetting machine, the combination, with a crank-shaft, of a pitman connected to the crank-arm and operating the plunger, a duplex cam-faced disk secured to one end of said crank-shaft, a rock-shaft arranged at right angles to the crank-shaft, and provided with the cam-faced rock-arms adapted to engage the cam-faced disk and oscillate the rock-shaft upon its longitudinal axis, an eccentric-arm secured to the opposite end of the rock-shaft, a movable arm pivoted to the frame, carrying a die, and adapted to move in the arc of a circle, and a link-arm connecting said movable arm and eccentric-arm, and a fixed die arranged opposite the movable die, all arranged and adapted to operate substantially as shown and described.

2. In a heading, forging, and upsetting machine, a power-shaft having a central crank, a pitman and a plunger connected therewith, a duplex cam-faced disk secured to the power-shaft, and a shaft oscillated upon its longitudinal axis by rock-arms secured thereto and bearing upon the duplex cam-faces, in combination with a gripping-jaw pivotally connected with the oscillating shaft and adapted to be moved in the arc of a circle, as and for the purpose set forth.

3. In combination with a reciprocating plunger, a fixed gripping-die, and a movable gripping-die carried by an oscillating arm, said arm being adapted to be closed by a toggle-joint the center line of whose bearings is parallel to the axis around which said die-carrier oscillates, substantially as shown and described.

4. In a heading, forging, and upsetting machine, a main power-shaft, a pulley loosely journaled thereon, a clutch splined upon the shaft and having a longitudinal movement upon the shaft, a shipping mechanism connected with the clutch and to an arm upon a gear, an intermeshing gear upon a shaft journaled in the frame, and a shipping-lever connected with the shaft, as and for the purpose set forth.

5. In a heading, forging, and upsetting machine, a main shaft, a pulley loosely journaled upon the shaft, a clutch adapted to be engaged therewith by a longitudinal movement upon the shaft, a brake-wheel upon the main shaft, in combination with a rock-shaft, a brake-strap secured at one end to the frame and at the opposite end to the shaft, and a gear upon the shaft which intermeshes with a pinion having a connection with the clutch, as and for the purpose set forth.

6. In a heading, forging, and upsetting machine, a shaft, a pulley upon the shaft, a clutch adapted to be engaged therewith, a rock-shaft, an eccentric and rod connected therewith, and a gearing upon the shaft connected with the clutch, as and for the purpose set forth.

7. In a heading, forging, and upsetting machine, a power-shaft, a clutch thereon, a rock-shaft journaled in the machine-frame and connected with the clutch by means of a pinion upon the shaft, and an intermeshing pinion connected with the shipping-lever of the clutch, in combination with a hand-lever connected with said secured shaft, as and for the purpose set forth.

8. In a heading, forging, and upsetting machine, a power-shaft, a pulley thereon, a clutch adapted to be engaged with the pulley by means of a shipping-lever, a brake-wheel upon the shaft, a strap secured at one end to a fixed object and at the opposite end to a rock-shaft, a bevel-gear upon the shaft, an intermeshing bevel-gear connected with the shipper-arm by an intermediate rod and arm, in combination with an eccentric and rod connected with the rock-shaft, as and for the purpose set forth.

9. In a heading, forging, and upsetting machine, a shaft, a pulley thereon, a clutch upon the shaft, adapted to be engaged with the pulley by a longitudinal movement upon the shaft, a rock-shaft journaled in the frame, a gear upon the shaft, an intermeshing gear connected with the clutch mechanism, a plate keyed upon a rock-shaft, provided with pawls extending in opposite directions, in combination with a plate movably journaled upon said rock-shaft and formed with catches with which the pawls engage when the plate is moved upon the shaft, and an eccentric and rod connected therewith, as and for the purpose set forth.

10. In a heading, forging, and upsetting machine, a shaft, a pulley thereon, a clutch adapted to be moved into engagement therewith by a lever connected with a pinion by an intermediate rod and arm, a rock-shaft provided with an intermeshing pinion, a pawl-carrying plate secured to the rock-shaft, a plate movable upon said shaft and connected with an eccentric, and adapted to turn the shaft when the pawls are in engagement with catches thereon, and a plate connected with a hand-lever and formed with projections adapted to raise the pawls from engagement with the catches, as and for the purpose set forth.

11. In a heading, forging, and upsetting machine, a power-shaft, a clutch thereon, a rock-shaft, a gear thereon intermeshing with a gear having a connection with the clutch mechanism, a clutch-faced sleeve loosely mounted upon the rock-shaft, a correspondingly-faced plate keyed to the rock-shaft and having oppositely-arranged pawls pivoted thereto, a plate upon the sleeve having catches that engage with the pawls, an eccentric and rod connected therewith, and a plate upon the sleeve formed with projections and adapted to raise the pawls, and a hand-lever connected with the latter plate, as and for the purpose set forth.

12. In a heading, forging, and upsetting machine, a power-shaft, a clutch thereon adapted to be moved upon the shaft by the movement of a rock-shaft, a brake-wheel upon the power-shaft, a brake-strap also connected with the rock-shaft, and adapted to be put in frictional engagement with the brake-wheel when the rock-shaft is turned in an opposite direction to that which moves the clutch, a plate formed with a clutch-faced sleeve, a pawl-carrying plate keyed to the rock-shaft, and having a clutch-face which engages with the clutch-face of the sleeve, a right-angled pawl secured to the pawl-carrying plate, the depending portion of which engages in a recess in the plate integral with the sleeve, a plate loosely mounted upon the sleeve and formed with catches with which the pawls engage, said plate being connected with an eccentric, and a hand-lever connected with the plate integral with the sleeve, as and for the purpose set forth.

13. In a heading, forging, and upsetting machine, a fixed gripping-jaw, a rock-bar journaled in the frame and receiving motion from a duplex cam through the medium of rocking arms, one of which is formed with a breaker, substantially as described, as and for the purpose set forth.

In testimony that I claim the foregoing as my own I hereby affix my signature in presence of two witnesses.

WILLIAM L. CLOUSE.

Witnesses:
WILLIAM WEBSTER,
HARRY H. McAVOY.